(12) United States Patent
Lin

(10) Patent No.: US 6,364,988 B1
(45) Date of Patent: Apr. 2, 2002

(54) PROCESS FOR PRODUCING A 3-LAYER CO-EXTRUDED BIAXIALLY ORIENTED POLYPROPYLENE SYNTHETIC PAPER OF THICKNESS 25-250 μM

(75) Inventor: Allen Fong-Chin Lin, Taipei (TW)

(73) Assignee: Nan Ya Plastics Corporation, Taipei (TW)

(*) Notice: Subject to any disclaimer, the term of this patent is extended or adjusted under 35 U.S.C. 154(b) by 0 days.

(21) Appl. No.: 09/394,914

(22) Filed: Sep. 13, 1999

(51) Int. Cl.[7] .............................. B29C 44/24
(52) U.S. Cl. ............... 156/244.17; 264/45.9; 264/173.14; 264/173.15; 264/288.8; 264/414; 264/423; 264/469
(58) Field of Search .................. 264/414, 423, 264/469, 288.8, 173.14, 173.15, 45.9; 156/244.17

(56) References Cited

U.S. PATENT DOCUMENTS 3,894,904 A * 7/1975 Cook .................. 156/229
4,522,887 A * 6/1985 Koebisu et al. .......... 428/461
5,084,334 A * 1/1992 Hamano et al. .......... 428/304.4
5,422,175 A * 6/1995 Ito et al. .................. 428/304.4
5,552,011 A * 9/1996 Lin ....................... 156/244.17
5,935,903 A * 8/1999 Goss et al. ............... 503/227

* cited by examiner

Primary Examiner—Allan R. Kuhns
(74) Attorney, Agent, or Firm—Bacon & Thomas

(57) ABSTRACT

Disclosed is a process for producing a 3-layer co-extruded biaxially polypropylene (hereinafter as BOPP) synthetic paper of thickness 25–250 μm. More particularly, the invention relates to a process for producing a 3-layer biaxially-oriented PP synthetic paper by means of 3-layer co-extrusion wherein two different PP resin compositions are separately extruded by one primary and two secondary extruders first, and then are co-flowed by a same T-die to form a three layers coating sheet, and through cooling, biaxial orientation, corona treatment and winding to form a 3-layer co-extrusion synthetic paper of thickness 25–250 μm. The 3-layer structure of said 3-layer co-extrusion synthetic paper of thickness 25–250 μm can be made into three kinds, such as: paper sheet layer/foamed intermediate layer/paper sheet layer with double side paper sheet layer, paper sheet layer/foamed intermediate layer/resin layer with single side paper sheet layer and resin layer/foamed intermediate layer/resin layer-with double side high gloss resin layer.

1 Claim, 2 Drawing Sheets

PROCESS FOR PRODUCING A 3-LAYER CO-EXTRUDED BIAXIALLY ORIENTED POLYPROPYLENE SYNTHETIC PAPER OF THICKNESS 25-250 µM

FIELD OF THE INVENTION

This invention relates to a process for producing a 3-layer co-extruded biaxially oriented polypropylene (hereinafter as BOPP) synthetic paper of thickness 25~250 µm. More particularly, the invention relates to a process for producing a 3-layer biaxially oriented PP synthetic paper by means of 3-layer co-extrusion wherein two different PP resin compositions are separately extruded by one primary and two secondary extruders first, and then are co-flowed by a same T-die to form a 3-layer coating sheet, and through cooling, biaxial orientation, corona treatment and winding to form a 3-layer co-extrusion synthetic paper of thickness 25~250 µm. The three layers structure of said 3-layer co-extrusion synthetic paper of thickness 25~250 µm can be made into three kinds, such as: paper sheet layer/foamed intermediate layer/paper sheet layer with double side paper sheet layer, paper sheet layer/foamed intermediate layer/resin layer with single side paper sheet layer and resin layer/foamed intermediate layer/resin layer with double side high gloss resin layer.

DESCRIPTION OF THE PRIOR ART

Nowadays the paper made of nature pulp is replaced by the polyolefin synthetic paper mainly comprising the basic substrate layer in the intermediate layer called biaxial oriented polypropylene (BOPP), whereon the back surface is laminated with the uniaxially oriented polypropylene (UOPP) containing inorganic fine powder as the paper surface layer(such as the Japanese Patent Publication No. 40794/71, Japanese Laid-open Publication No. 141339/81, Japanese Laid-open Publication No. 118437/81 and Japanese Laid-open Publication No.87225/91).

The substrate layer used in the above-mentioned process between the longitudinal orientation device and lateral orientation device can be subjected to form paper sheet layer by using two extruders for casting the upper layer and lower layer. Paper sheet layer can merely be drawn in the lateral and uniaxial axis orientation, so its strength is lower. The inorganic powder added to enhance the paper sheet layer will apt to lose during printing processing, this causes the trouble to clean the printer. On the other hand, the drawing ratio of the paper sheet layer manufactured from single axis drawing (uniaxial orientation) may be different from the total drawing ratio of the substrate layer manufactured from biaxial orientation. When the synthetic paper is heated, the shrinkage ratio between the paper sheet layer and the substrate layer varies, this always cause the corrugated deformation in the synthetic paper.

For the stability of processing and the product quality, the production speed of two extruders used for casting the upper layer and lower layer to enhance the layer thickness to form the paper sheet layer will be more restricted. The width of the synthetic paper manufactured is lower than 6 meters., and the thickness of the single one paper sheet layer should be greater than 10 µm (usually is 30 µm). So the thickness of the synthetic paper product is always greater than 60 µm, this may cause dispersity of the product thickness, and will deteriorate the print processing. As a whole, due to technical difficulty of processing., the production cost will be increased to limit the productivity, and can not be promoted to spread the application uses.

SUMMARY OF THE INVENTION

It is an object of this invention to provide a novel process for producing a 3-layer co-extrusion biaxially oriented polypropylene (BOPP) synthetic paper of thickness 25~250 µm.

In view of the foregoing, this invention is intended to obviate the above-mentioned problems, and has for its object to provide a synthetic paper have a 3-layer structure, which is constructed by paper sheet layer or resin layer foamed intermediate layer paper sheet layer or resin layer. The PP resin composition used for foamed intermediate layer is extruded by a twin screw primary extruder with side feeding hopper. While the PP resin compositions used for paper sheet layer and/or resin layer are extruded by two twin screw secondary extruders with side feeding hopper. The above-mentioned extrudates are co-flowed by a same T-die to co-extrude and form a three layers coating sheet, and through cooling, biaxial orientation, corona treatment, and winding to form a 3-layer co-extrusion BOPP synthetic paper of double side, single side paper sheet layer and double side resin layer with high gloss.

The synthetic paper obtained by co-flowing the extrudate and then co-extruding to subject to biaxial orientation according to this invention, and the synthetic paper obtained by laminating the intermediate layer which is biaxially drawn with the paper sheet layer which is uniaxially drawn, are different whatever in structure and processing method. Meanwhile, the processing method according to this invention preferably uses resin compositions that comprises inorganic filler or not which can be extruded in the secondary extruder to form BOPP synthetic paper having paper sheet layer/foamed intermediate layer/paper sheet layer of double side paper sheet layer, BOPP synthetic paper having paper sheet layer/formed intermediately layer/resin layer of single side paper sheet layer, BOPP synthetic paper having resin layer/foamed intermediate layer/resin layer of double side high gloss resin layer. These synthetic papers can be used as the substrate layer for art paper grade synthetic paper.

There has been a long felt need for a synthetic paper which may be manufactured in larger width over 6 meters and smaller thickness below 60 µm, and excellent physical properties in printability, pen-writing, packaging . . . etc.

The BOPP synthetic paper obtained according to this invention, due to the specific process and compositions, will make much difference with the synthetic paper obtained according to conventional prior art. The paper sheet layer of the above-mentioned conventional prior art which is obtained by casting melt resin composition whereon only after longitudinal and uniaxial orientation is a uniaxial orientation layer. The BOPP synthetic paper obtained according to this invention can replace natural pulp, can be used in various applications. The merits can be shown as follows:

1. The composition ingredients of said paper sheet layer is mainly comprised of polypropylene (PP), polyethylene (PE), titanium oxide and inorganic powder. The haze effect of this paper sheet layer is excellent, and the whiteness, hiding power (represented as opaqueness) are better than those of conventional paper.

2. The strength of said paper sheet layer obtained by biaxial orientation is excellent. The fixation of inorganic powder onto the surface of said paper sheet layer is fine enough not to cause powder fell while print processing.

3. 3-layer of the BOPP synthetic, such as: paper sheet layer or resin layer/foamed intermediate layer paper sheet layer or resin layer have the drawing ratio in itself, will be uniformly shrank, and the paper sheet layer or resin layer will not to cause corrugated deformation upon heating. The paper sheet layer and foamed intermediate layer of same drawing ratio will not easily delaminate.

4. The thickness of paper sheet layer and resin layer can be controlled in the range of 1 µm~30µm by the extrudate amount from secondary extruder (as the product thickness and application required).

5. The production speed is large to reach 3.5 tons/hr, and the width of the BOPP synthetic paper can reach to 8 meters. The total thickness of the BOPP synthetic paper can vary in the range of 25~250 µm.

6. The 3-layer of the BOPP synthetic paper such as: paper sheet layer or resin layer foamed intermediate layer paper sheet layer or resin layer can be extruded by the twin screw extruder with side feeding hopper. The resin composition fed into the extruder can be uniformly blended, so the coating sheet can be controlled with ±2%.

7. To reduce the production cost for market competence.

The inorganic powder can be fed into the side feeding hopper in the powder state without pre-forming it into master batch, this can largely reduce the production cost. Furthermore, the master batch of inorganic powder blended with resin can also be used in the single screw extruder only if by effectively raising the L/D (length/diameter) of the screw to reach uniform blending effect.

BRIEF DESCRIPTION OF THE DRAWINGS

Referring to the attached drawings, in FIGS. 1a–c, there are shown three kinds of 3-layer co-extruded BOPP synthetic papers in this invention, wherein:

(1) represents the 3-layer structure of BOPP synthetic paper having paper sheet layer foamed intermediate layer paper sheet layer with double side paper sheet layer;

(2) represents the 3-layer structure of BOPP synthetic paper having paper sheet layer foamed intermediate layer resin layer with double side paper sheet layer;

(3) represents the 3-layer structure of BOPP synthetic paper having resin layer/foamed intermediate layer paper sheet layer with double side paper sheet layer.

Figure 1A:
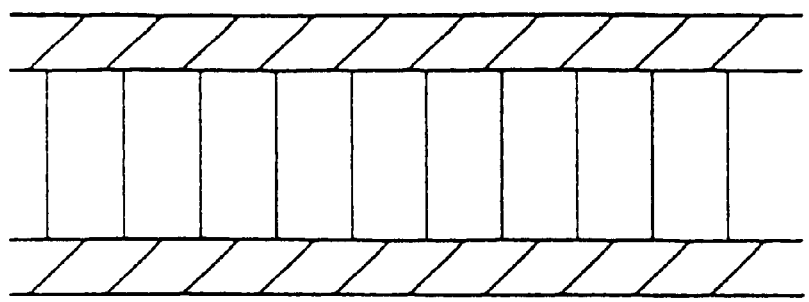
Figure 1B:
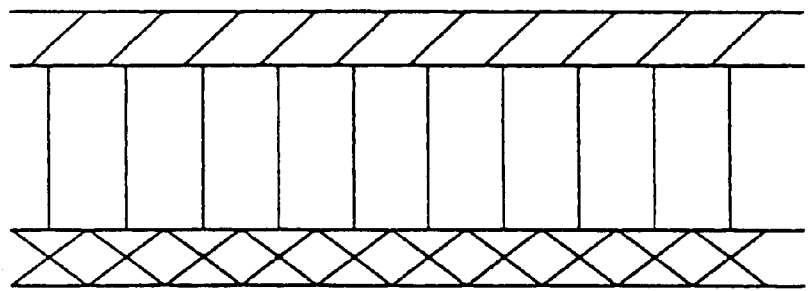
Figure 1C:
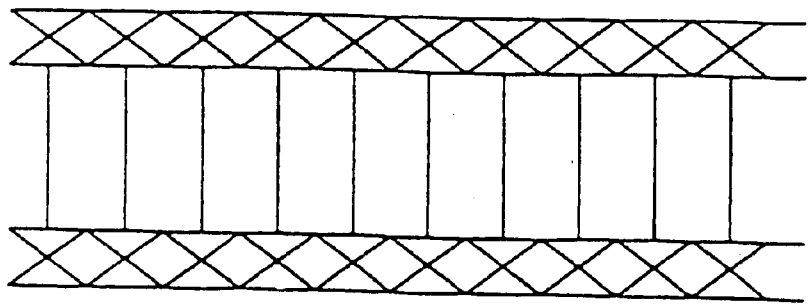
Figure 2:
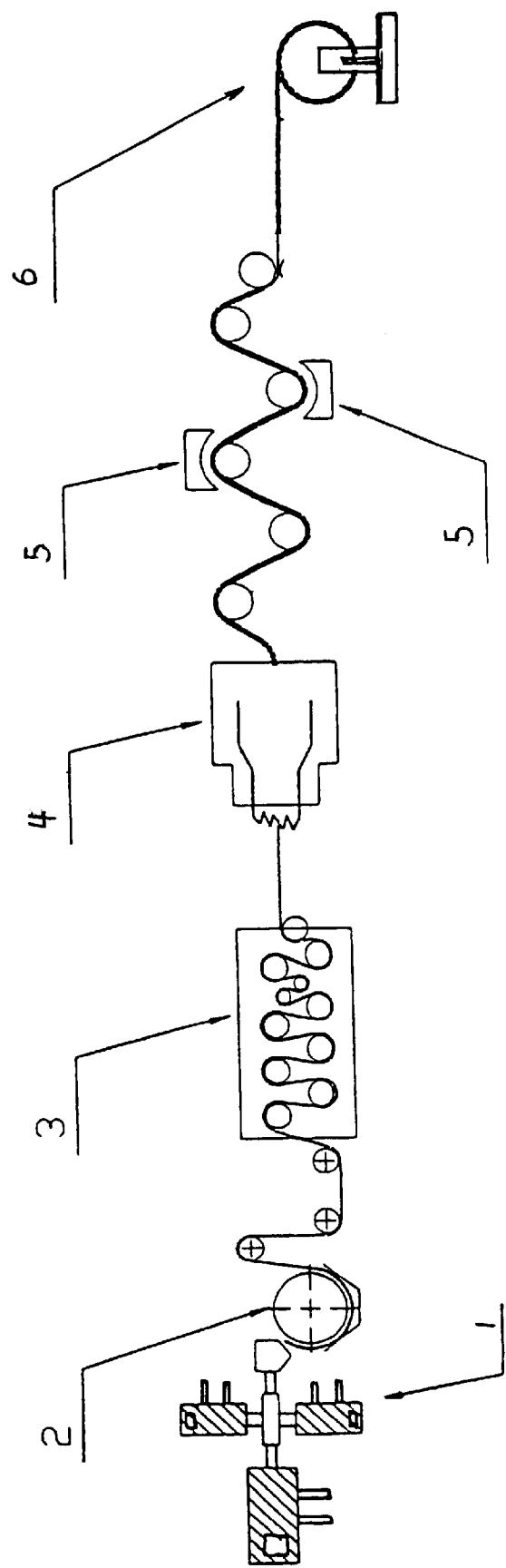

In FIG. 2, there is shown the processing device of this invention, wherein:

(1) represents an Extruding device (2) represents a Cooling and shaping device (3) represents Longitudinal orientation device (4) represents a Lateral orientation device (5) represents a Corona treatment device (6) represents a Winding device

DETAILED DESCRIPTION OF THE INVENTION

The device in pursuance of the process of this invention are further described as follows:

Extruder device (numeral 1 in FIG. 2):

It comprises one primary extruder with two side feeding hoppers, and two secondary extruder whose temperature conditions vary with the ingredients of resin composition, MFI (melt flow index), crystallinity, viscosity, additives and production line 3-layer structure of coating stuff (paper sheet layer or resin layer/foamed intermediate/paper sheet layer or resin layer) of this invention is achieved with 3-layer co-extrusion, where the 3-layer extrudate forms a co-flow at the T-die for 3-layer co-extrusion through a designed combination of T-die flow path.

Cooling and shaping roller device (numeral 3 in FIG. 2):

It adopts the water cooling or air cooling device to cool and form the 3-layer co-extrudate of high temperature between 180° C. and 280° C. The control of cooling temperature in this process is quite important, which promises the success of the steps of following process. The cooling temperature is normally set at 15–60° C. being adjustable depending on the thickness of synthetic paper and the speed of production line.

Longitudinal orientation device (numeral 3 in FIG. 2):

The cooled and formed sheet is fed in this device for preheating to soften the paper sheet at 115–150° C. (depending on the thickness of required paper sheet and the speed of production line), and then be oriented in two steps with low and high speed so as to enhance the longitudinal mechanical strength of coating layer which being then tempered and formed. In general, the longitudinal draw ratio is set at 3~6 times.

Lateral orientation device (numeral 4 in FIG. 2):

The thinner paper sheet formed through the foregoing longitudinal orientation treatment is preheated and softened at 140~195° C. (depending on the thickness of paper sheet and the speed of production line) and then laterally oriented and finally tempered and formed so as to partially reduce the dimension of coating layer for its stability. Generally, the lateral drawing ratio is set at 5~12 times depending on the required feature of product.

Corona treatment (numeral 5 in FIG. 2):

This treatment is to improve the surface characteristics of coating layer for enhancing the adhesion between coating layer surface and paper surface treating agent, where the device of high frequency discharging with a power of 20~120 KW is used (depending on the speed of production line) so as to obtain a surface wetting tension of 36~48 dyne/cm$^2$.

Winding device (numeral 6 in FIG. 2):

The coating layer of present invention is taken up to be a end product with 8M width by a tubular device, and then can be striped into thickness of 25~250 µm rolled or sheeted product.

For the understanding of technical content of this invention, the description on the aspects including polypropylene resin composition, processing (including extrusion, 3-layer co-extrusion, cooling, biaxial orientation, corona treatment, winding) can be disclosed as follows.

The BOPP synthetic paper of this invention having 3-layer structure, which is constructed by paper sheet layer or resin layer foamed intermediate layer paper sheet layer or resin layer. The PP resin composition used for foamed intermediate layer is extruded by a twin screw primary extruder with side feeding hopper. While the PP resin composition used for foamed intermediate layer is extruded by a twin screw primary extruder with side feeding hopper. While the PP resin composition used for paper sheet layer or resin layer are extruded by two twin screw secondary extruders with side feeding hopper. The above-mentioned extrudates are co-flowed by a same T-die to co-extrude and form a 3-layer coating sheet, and through cooling, biaxial orientation, corona treatment, and winding to form a 3-layer co-extruded BOPP synthetic paper of double side, single side paper sheet layer and double side resin layer with high gloss.

The PP resin composition used for foamed intermediate layer is extruded by a twin screw primary extruder with side feeding hopper. The said polypropylene resin composition including the polypropylene (PP) resin (MFI=0.5~8) of 35~95% weight having high crystallinity of isotacticity above 97%, and antistatic agent of 1~5% are uniformly blended into the front side of the twin screw primary extruder from side feeding hopper. While calcium carbonate of 0~40% weight, titanium oxide of 0~20% weight are fed through one or two side feeding hopper by metering device into the primary extruder, and the mixtures are uniformly blended by the twin screw primary extruder toward the intermediate runner of T-die. While the PP resin compositions used for paper sheet layer and/or resin layer are extruded by two twin screw secondary extruders with side feeding hopper. The polypropylene resin composition including polypropylene resin of 22~99.5% weight, polyethylene (PE) resin of 0~12% weight, antistatic agent of 0~3% weight, antiblocking agent of 0.5~3% weight and ultraviolet absorbent of 0~2% weight is extruded from one secondary twin screw extruder which is uniformly blended into the front side of the twin screw primary extruder from side feeding hopper. While calcium carbonate of 0~40% weight, titanium oxide of 0~20% weight are fed through one or two side feeding hopper by metering device into the secondary extruder, and the mixtures are uniformly blended by the twin screw secondary extruder toward the two intermediate runners of T-die. The three compositions are extruding separately from one primary and two secondary twin screw extruders at temperature 180~280° C. to be co-flowed and extruded through a same T-die to form a coating sheet of three layers and then the said coating sheet is cooled and formed at 15~60° C., then subjecting to biaxial orientation which comprising the preheating at 120~150° C., drawing, and tempering in the a manner of 3~6 times draw of longitudinal orientation, and preheating at 130~190° C., drawing and tempering in the manner of 5~12 times draw ratio of lateral orientation, then subjecting to high frequency corona treatment with 20~150 KW power, then taking up by winding machine to form a 3-layer co-extruded biaxially oriented synthetic paper of thickness 25~250 μm, in which the 3-layer structure of said BOPP synthetic paper in the form of paper sheet layer/foamed intermediate layer/paper sheet layerwith double side paper sheet layer, paper sheet layer/foamed intermediate layer/resin layer with single side paper sheet layer, resin layer/foamed intermediate layer/resin layer with double side high gloss resin layer.

PP resin used in this invention which having high crystallinity as the essential ingredients to be suitable for cultural paper. The PP resin used by the coating layer of this invention are homopolymer with high crystallinity of melt flow index 2~6 (230° C./2.16 kg, ASTM D 1238) and most of them are isotactic. Such a high polymer configuration allows a tidy array between molecular chains, and the magnitude of molecular weight and the distribution state will also influence the mechanical strength and the quality homogeneity of synthetic paper.

BOPP synthetic paper obtained according to this invention has 3-layer structure, which can reach the imitation paper effect by matching polyethylene resin, inorganic powder, and the gloss, pen-writing influence and print availability can also be controlled by the using amount proportion. Polyethylene resin used is of grade of melt flow index (MFI) 0.1–7, and the strength of synthetic paper can be controlled by different grade of polyethylene resin.

The inorganic powders used in this invention mainly play the function for significantly decreasing the specific gravity of foamed intermediate layer, due to the formulation of micropore produced during the biaxial orientation, and thus provide the paper sheet layer of excellent pen-writing and printability that is superior to conventional synthetic paper. The inorganic powder can be one or more than two selected from the group of calcium carbonate, diatomite, kaolin clay, calcium oxide, barium sulfate and titanium oxide, and the particle size of inorganic powder ranges from 0.1 to 10 μm, the used amount depends on the physical properties required.

The inorganic powder filler can be directly fed into the side feeding hopper of the twin screw extruder without the step required in prior arts for acquiring the master batch made from inorganic filler and resin first, and then mixing it with PP resin to be fed in the extruders. This will certainly save operation step and reduce the production cost.

The titanium dioxide used in this invention is mainly rutile type titanium dioxide which provides the function for adjusting the opaqueness, whiteness of synthetic paper and enhancing the effect of ultraviolet resistance.

The antistatic agent used in this invention could be the same as those used in the bi-axially oriented PP, in which tertiary amine, amide preferably used can eliminate the static effect caused in the coating process.

In order to prolong the life cycle of the BOPP synthetic paper of this invention and to prevent ageing and decomposing from ultraviolet (UV) absorbent of 0~2 % weight can be used.

In order to prevent the mutual adhesion between the coating layers from occurring while coating and winding process, the antiblocking agent is required, and generally it may be such as silica, clay, polymethyl methacrylate (PMMA), glass bead.

The specific gravity of the BOPP synthetic paper is below 0.75, which can be adjusted by changing the composition formulation. This specific gravity is lower than that of the synthetic paper obtained from Japan Laid-Open Publication 87255/1991. This can favors the consumers to use much more paper area on the basis of same unit weight, and to save money.

The thickness proportion in the 3-layer BOPP synthetic paper obtained by this invention can be shown as follows:

| | Thickness | | | | | |
|---|---|---|---|---|---|---|
| layer | 25 μm | 50 μm | 100 μm | 150 μm | 200 μm | 250 μm |
| Paper sheet layer or resin layer | 1~3 μm | 1~10 μm | 1~20 μm | 2~30 μm | 5~30 μm | 10~30 μm |
| Intermediate layer | 23~19 μm | 48~30 μm | 98~60 μm | 146~90 μm | 190~140 μm | 230~190 μm |
| Paper sheet layer or resin layer | 1~3 μm | 1~10 μm | 1~20 μm | 2~30 μm | 5~30 μm | 10~30 μm |

The thickness of paper sheet layer and resin layer can be fell into the range of 1~30 μm, this can be adjusted as product requirement.

DESCRIPTION OF THE PREFERRED EMBODIMENTS

In order to understand the technical features of this invention, various characteristics and applications of 3-layer BOPP synthetic paper made from PP compositions is shown as embodiment examples. We provide some embodiments to describe it in details. This includes the production of writing, printing, packaging and various applications of synthetic paper. However, these examples cannot be explained as limitations of the scope of this invention.

EMBODIMENT EXAMPLE 1

BOPP Synthetic Paper with Single Side Paper Sheet Layer of Thickness Below 250 μm (sample 1,2,3 enclosed)

PP resin (MFI=2.4) of 67% weight and antistatic agent of 3% weight is mixed and fed in the primary twin extruder from the side feeder. In the meanwhile, the calcium carbonate powder of 20% weight, and titanium oxide of 10% weight metered by metering device are separately fed into the two twin screw primary extruders from side feeder. On the other way, PP resin (MFI=5) 62% weight, PE resin (MfI=) 12% weight, antistatic agent 2% weight, antiblocking agent 3% weight and ultraviolet absorbent 1% weight are mixed by a mixer and fed into the #1 twin screw secondary extruder from side feeder. In the meanwhile, the calcium carbonate powder of 10% weight and titanium oxide 10% weight metered by metering device are separately fed into the #2 twin screw secondary extruder from two side feeders. Then PP resin (MFI=2.4) 97% weight and antiblocking agent 3% weight are mixed by a mixer and fed in the twin screw #2 secondary extruder from side feeder. At the extruder temperature of 200~280° C., these mixtures are extruded through the same one T-die by means of three-layers coextrusion. At the temperature 15~60° C. of cooling rollers, the PP coating sheet is cooled and shaped, then preheated at 120~150° C. and fed into the lateral orientation device for drawing 5 times for lateral orientation, then tempered and cooled, preheated and drawn 9 times for longitudinal orientation to enter into a longitudinal orientation device whose temperature set at 150~185° C., and, then tempered and cooled to control the shrinkage ratio of the thus obtained three layers synthetic paper. After this step, the three layers synthetic paper is subjected to corona treatment for better printability, finally taken up by winding machine. BOPP synthetic paper with single side paper sheet layer of thickness below 250 μm can be manufactured by the above method, and used in various applications such as: pen-writing, printing, packaging . . . etc. The physical properties of BOPP synthetic paper with single side paper sheet layer in three different thickness of 60 μm (see attached sample 1), 100 μm (see attached sample 2) and 120 μm (see attached sample 3) made by this embodiment example are shown as following table.

| Item | Unit | Kind 60 μm | 100 μm | 120 μm | Test Method |
|---|---|---|---|---|---|
| Specific gravity | — | 0.70 | 0.70 | 0.70 | ASTM D-1248 |
| Basic weight (weight per unit area) | g/cm² | 42.0 | 70.0 | 84.0 | JIS P-8124 |
| Gloss | % | 25/110 | 26/110 | 25/111 | TAPPI T-480 |
| Whiteness | % | 97 | 97 | 97 | TAPPI T-525 |
| Opaqueness | % | 85 | 92 | 94 | TAPPI T-425 |
| Roughness | μm | 0.70 | 0.70 | 0.70 | TAPPI T-555 |
| Surface resistivity |  | $10^{12}$ | $10^{12}$ | $10^{12}$ | EN-45014 |

EMBODIMENT EXAMPLE 2

BOPP Synthetic Paper with Double Side Paper Sheet Layer of Thickness Below 250 μm (sample 4,5,6 enclosed)

PP resin (MFI=2.4) of 67% weight and antistatic agent of 3% weight is mixed and fed in the primary twin extruder from the side feeder. In the meanwhile, the calcium carbonate powder of 20% weight, and titanium oxide of 10% weight metered by metering device are separately fed into the two twin screw primary extruders from side feeder. On the other way, PP resin (MFI=5) 62% weight, PE resin (MFI=1) 12% weight, antistatic agent 2% weight, antiblocking agent 3% weight and ultraviolet absorbent 1% weight are mixed by a mixer and fed into the #1 twin screw secondary extruder from side feeder. In the meanwhile, the calcium carbonate powder of 10% weight and titanium oxide 10% weight metered by metering device are separately fed into the #2 twin screw secondary extruder from two side feeders. Then PP resin (MFI=2.4) 97% weight and antiblocking agent 3% weight are mixed by a mixer and fed in the twin screw #2 secondary extruder from side feeder. At the extruder temperature of 200~280° C., these mixtures are extruded through the same one T-die by means of 3-layer co-extrusion. At the temperature 15~60° C. of cooling rollers, the PP coating sheet is cooled and shaped, then preheated at 120~150° C. and fed into the lateral orientation device for drawing 5 times for lateral orientation, then tempered and cooled, preheated and drawn 9 times for longitudinal orientation to enter into a longitudinal orientation device whose temperature set at 150~185° C., and, then tempered and cooled to control the shrinkage ratio of the thus obtained 3-layer synthetic paper. After this step, the 3-layer synthetic paper is subjected to corona treatment for better printability, finally taken up by winding machine. BOPP synthetic paper with single side paper sheet layer of thickness below 250 μm can be manufactured by the above method, and used in various applications such as: pen-writing, printing, packaging . . . etc. The physical properties of BOPP synthetic paper with single side paper sheet layer in three different for longitudinal orientation to enter into a longitudinal orientation device whose temperature set at 155~190° C., then tempered and cooled to control the shrinkage ratio of the thus obtained 3-layer synthetic paper. After this step, the 3-layer synthetic paper is subjected to corona treatment for better printability, finally taken up by winding machine BOPP synthetic paper with double side paper sheet layer of thickness below 250 μm can be manufactured by the above method, and can be used in various applications such as: pen-writing, printing, packaging . . . etc. The physical properties of BOPP synthetic paper with double side paper sheet layer in three different thickness of 60 μm (see attached sample 4), 100 μm (see attached sample 5) and 150 μm (see attached sample 6) made by this embodiment example are shown as following table.

| Item | Unit | Kind 60 μm | Kind 100 μm | Kind 120 μm | Test Method |
|---|---|---|---|---|---|
| Specific gravity | — | 0.70 | 0.70 | 0.70 | ASTM D-1248 |
| Basic weight (weight per unit area) | g/cm$^2$ | 42.0 | 57.0 | 81.0 | JIS P-8124 |
| Gloss | % | 26/25 | 26/26 | 27/26 | TAPPI T-480 |
| Whiteness | % | 97 | 97 | 97 | TAPPI T-525 |
| Opaqueness | % | 89 | 94 | 96 | TAPPI T-425 |
| Roughness | μm | 0.70 | 0.70 | 0.70 | TAPPI T-555 |
| Surface resistivity | | $10^{12}$ | $10^{12}$ | $10^{12}$ | EN-45014 |

EMBODIMENT EXAMPLE 3

BOPP Synthetic Paper with Double Side Paper Sheet Layer of Thickness Below 250 μm (sample 7,8,9 enclosed)

PP resin (MFI=2.4) of 62% weight and antistatic agent of 3% weight are mixed and fed in the primary twin extruder from the side feeder. In the meanwhile, the calcium carbonate powder of 20% weight, and titanium oxide of 15% weight metered by metering device are separately fed into the twin screw primary extruders from two side feeders. On the other way, PP resin (MFI=3.0) 96% weight, antistatic agent 2% weight, and antiblocking agent 3% weight are mixed by a mixer and separately fed into the two #1, #2 twin screw secondary extruders from side feeder. At the extruder temperature of 200~280° C., these mixtures are extruded through the same one T-die by means of three layers co-extrusion. At the temperature 15~60° C. of cooling rollers, the PP coating sheet is cooled and shaped, then preheated at 120~150° C. and fed into the lateral orientation device for drawing 5 times for lateral orientation, then tempered and cooled, preheated and drawn 9 times for longitudinal orientation to enter into a longitudinal orientation device whose temperature set at 150~185° C., then tempered and cooled to control the shrinkage ration of the thus obtained 3-layer synthetic paper. After this step, the 3-layer synthetic paper is subjected to corona treatment for better printability, finally taken up by winding machine. BOPP synthetic paper with double side paper sheet layer of thickness below 250 μm can be manufactured by the above method, and can be used in various applications such as: pen-writing, printing, packaging . . . etc. The physical properties of BOPP synthetic paper with double side paper sheet layer in three different thickness of 70 μm (see attached sample 7), 110 μm (see attached sample 8) and 140 μm (see attached sample 9) made by this embodiment example are shown as following table.

| Item | Unit | Kind 70 μm | Kind 110 μm | Kind 140 μm | Test Method |
|---|---|---|---|---|---|
| Specific gravity | — | 0.70 | 0.70 | 0.65 | ASTM D-1248 |
| Basic weight | g/cm$^2$ | 49.0 | 77.0 | 91.0 | JIS P-8124 |
| (weight per unit area) | | | | | |
| Gloss | % | 110/111 | 112/110 | 109/110 | TAPPI T-480 |
| Whiteness | % | 85 | 97 | 89 | TAPPI T-525 |
| Opaqueness | % | 85 | 92 | 94 | TAPPI T-425 |
| Roughness | μm | 0.5 | 0.5 | 0.5 | TAPPI T-555 |
| Surface resistively | | $10^{12}$ | $10^{12}$ | $10^{12}$ | EN-45014 |

This invention has been shown and described in preferred form only, and by way of examples, and many variations may be made in the invention which will be comprised within its spirit. It is understood, therefore, that the invention is not limited to any specific form or embodiment except insofar as such limitations are included in the appended claims.

What is claimed is:

1. A process for producing a 3-layer co-extruded biaxial-oriented polypropylene (BOPP) synthetic paper of thickness 25–250 μm comprising:

(a) extruding by means of a twin screw primary extruder having side feeder a foamed intermediate layer paper sheet layer from a first resin composition comprising 39–95% by weight of a high crystallinity polypropylene having over 97% isotacticity (MFI=0.5–8) 0–40% by weight of calcium carbonate powder, 0–20% by weight of titanium oxide powder and 1–5% by weight of antistatic agent;

(b) extruding by means of two twin screw secondary extruders having side feeder and inlet hopper two layers from a second resin composition comprising 22–99.5% by weight of polypropylene 0–12% by weight of polyethylene 0–40% by weight of calcium carbonate powder, 0–20% by weight of titanium oxide powder, 0–3% by weight of antistatic agent, 0.5–3% by weight of antiblocking agent and 0–2% by weight of ultraviolet absorbent;

said first and second resin composition being extruded for co-flow at 180 to 280° C.;

(c) extruding said co-flow through a T-die to form a BOPP synthetic paper with three layers comprising a top paper sheet (or resin) layer, a foamed intermediate layer, and a bottom paper sheet (or resin) layer, wherein said foamed intermediate layer is formed from an extrudate from said twin screw primary extruder having side feeder and said paper sheet (or resin) layer is formed from an extrudate from said two twin screw secondary extruders having side feeder and inlet hopper;

(d) cooling and shaping said BOPP synthetic paper by passing through a cooling roller at 15 to 60° C., and being axially oriented in draw ratio in the range of 3–6 of a longitudinal orientation through preheating, orienting and tempering under 115 to 150° C., and in draw ratio in the range of 5–12 of lateral orientation through preheating, orienting and tempering under 140 to 195° C.;

(e) treating said BOPP synthetic paper through corona discharge treatment with a high frequency wave under a power of 20–120 KW; and (f) taking up said BOPP synthetic paper by a winding device to form a roll of said BOPP synthetic paper of thickness 25–250 μm in the form of paper sheet layer/foamed intermediate layer/of paper sheet layer, paper sheet/foamed intermediate layer/resin layer and resin layer/foamed intermediate layer/resin layer.

* * * * *